(12) United States Patent
Bornhorst et al.

(10) Patent No.: US 6,648,114 B2
(45) Date of Patent: Nov. 18, 2003

(54) FLEX DISK BRAKE IN A PRESS MACHINE

(75) Inventors: John B. Bornhorst, New Bremen, OH (US); Kevin J. Evers, Fort Recovery, OH (US)

(73) Assignee: The Minster Machine Company, Minster, OH (US)

( * ) Notice: Subject to any disclaimer, the term of this patent is extended or adjusted under 35 U.S.C. 154(b) by 0 days.

(21) Appl. No.: 09/877,630

(22) Filed: Jun. 8, 2001

(65) Prior Publication Data

US 2002/0185018 A1 Dec. 12, 2002

(51) Int. Cl.$^7$ ............................................. F16D 67/04
(52) U.S. Cl. ..................... 192/18 A; 188/170; 192/200; 464/98
(58) Field of Search ............................. 192/18 A, 200, 192/52.6, 70.28; 188/166, 72.3, 170; 267/161; 464/100, 162, 98

(56) References Cited

U.S. PATENT DOCUMENTS

| | | | |
|---|---|---|---|
| 2,259,461 A | * | 10/1941 | Eason ....................... 192/70.17 |
| 2,345,244 A | * | 3/1944 | Eason ....................... 192/70.28 |
| 2,674,356 A | * | 4/1954 | Eason ....................... 192/18 A |
| 2,942,708 A | * | 6/1960 | Eason ....................... 192/18 A |
| 3,029,071 A | * | 4/1962 | Wells ........................ 267/161 |
| 3,871,499 A | * | 3/1975 | Kazuma ................... 192/70.18 |
| 3,893,191 A | | 7/1975 | Gold et al. |
| 4,071,940 A | | 2/1978 | Hazelton |
| 4,095,523 A | | 6/1978 | Drungil |
| 4,533,029 A | | 8/1985 | Weber |
| 4,569,426 A | | 2/1986 | Sekella et al. |
| 4,850,933 A | * | 7/1989 | Osborn ........................ 464/100 |
| 4,871,342 A | * | 10/1989 | Boss et al. ................... 192/200 |
| 5,651,436 A | | 7/1997 | Sommer |
| 5,873,444 A | | 2/1999 | Kozhevnikov et al. |
| 6,065,577 A | * | 5/2000 | Arhab et al. .............. 192/70.18 |
| 6,112,871 A | | 9/2000 | Yoshida |
| 6,142,275 A | | 11/2000 | Kreisl et al. |

* cited by examiner

Primary Examiner—Rodney H. Bonck
(74) Attorney, Agent, or Firm—Randall J. Knuth

(57) ABSTRACT

A brake assembly includes a flex disk brake secured to a brake device of a press clutch-brake combination. A plurality of axially flexible finger elements extends from a peripheral side of the flex disk in a bent or arcuate configuration. The finger elements extend at least in part in a circumferential direction of the flex disk generally opposite to a direction of rotation of the press crankshaft. Each finger element is secured at one end to the stationary press crown. During brake activation, the axial flexibility of each finger element accommodates axial displacement of the attached brake device as the brake device undergoes actuated movement into its braking position. The flex brake disk provides a torquing rigidity that renders it rotationally stationary.

35 Claims, 6 Drawing Sheets

FLEX DISK BRAKE IN A PRESS MACHINE

BACKGROUND OF THE INVENTION

1. Field of the Invention

The present invention relates to clutch-brake combinations for use in press machine environments, and, more particularly, to a brake system employing a flex disk brake.

2. Description of the Related Art

Mechanical presses of the type performing stamping and drawing operations have a conventional construction comprising a crown and a bed portion configured within a frame structure. A slide supported within the frame is adapted for reciprocating movement toward and away from the bed. The slide is driven by a crankshaft having a connecting arm coupled to the slide. These mechanical presses are widely used for a variety of workpiece operations employing a diverse array of die sets, with the press machine varying substantially in size and available tonnage depending upon its intended use.

The drive apparatus of a press machine typically includes a drive motor directly engaged to rotate a massive flywheel. The flywheel serves as the source of rotational energy that is appropriately distributed throughout the machine. A clutch assembly selectively connects the flywheel to the crankshaft during a press working cycle. Energy is removed from the flywheel and transferred to the rotating parts of the press, namely, the crankshaft. The crankshaft rotation controls the reciprocating motion of the slide. The linear driving force produced by motion of the slide is used to process a workpiece disposed between respective die shoes attached to the slide and bolster assembly. During operation, then, the rotational energy of the flywheel is used to drive the rotating parts of the machine and produce the stamped part.

The clutch typically forms part of a clutch-brake combination that coordinates the braking function and clutch function. During operation, when a press cycle is initiated, the clutch-brake combination is adapted to disengage the brake at the same time that the clutch is engaged. Following completion of the working cycle, the press operation is terminated by activating the brake, which concurrently disengages the clutch to disconnect the flywheel from the crankshaft. The brake and clutch mechanisms cooperate in an interdependent fashion such that activation of one component necessarily causes a concurrent deactivation of the other component.

In one form, the brake assembly acts to apply a braking action to the working components of the machine by stopping all of the rotating parts except the flywheel. For this purpose, the brake is adapted for selective connection to the crankshaft. In one configuration, a brake component such as a brake disk rotates in unison with a clutch component such as a clutch plate mounted to the crankshaft. A stationary brake plate is disposed between the brake disk and clutch plate.

When the brake is activated, the clutch is released from the flywheel. At the same time, the brake activation causes both the rotating clutch plate and the rotating brake disk to be brought into frictional contacting engagement with the stationary brake plate at opposite sides thereof. The frictional coupling employs brake lining material mounted on the rotating parts. In effect, the stationary brake plate becomes pinched between the brake disk and clutch plate.

Although the brake plate is designed for stationary movement in the rotational direction, the brake plate is adapted for axial movement between the adjacent rotary parts to enable the clutch plate and brake disk to center the stationary brake plate and create a full surface-to-surface abutting engagement. Otherwise, less than full contact may occur between the stationary brake plate and the rotary parts. This axial movement is typically along a dimension parallel to the longitudinal axis of the crankshaft.

The stationary brake plate is mounted on keys, pins, splines, studs or other such mechanisms to restrain rotational movement of the brake plate while allowing linear movement between the rotary parts of the clutch-brake combination. However, as the die repetitively impacts the workpiece during the stamping process, the resulting vibrational activity will pound out these spline devices and create unwanted clearances between the stationary brake plate and the splines or keys. These free and undamped clearances will allow the brake plate to move in the rotary direction during braking, thus causing impact loadings on the keys or spline devices. These impact loading forces increase with the amount of clearance. Also, this free and undamped clearance will allow the brake to move up and down due to the vibrations from the die when stamping out the parts at a high rate of speed. This action will pound out the clearance between the brake plate and key.

SUMMARY OF THE INVENTION

A flex disk brake is provided in the form of a disk structure annularly disposed about the press crankshaft and having a ring-shaped central body portion. The flex disk includes a plurality of flange-type arm portions each extending from a peripheral edge of the central ring portion in a spiral configuration which preferably forms a circumferential slot with the central ring portion. The arm portions are fixedly mounted to the press crown at respective ends thereof to establish a stationary anchor point.

The flex disk brake is fixedly mounted at its central ring portion to a brake component of the clutch-brake combination. Additionally, the arm portions are arranged to extend in a direction opposite to the typical direction of rotation of the crankshaft to allow the arm portions to offer maximum braking resistance. In a preferred form, the individual arm portions extend sufficiently in the circumferential direction to form a slot with the outer circumferential edge of the ring portion such that the preferred direction of crankshaft rotation is directed towards the closed end of the slot, although opposite rotation is also provided for.

The flex disk brake is rotationally stationary and axially flexible. Accordingly, the flex disk brake eliminates free and undamped clearances of the brake disk in the rotational direction, while simultaneously accommodating axial sliding of the brake disk due to an axially-directed flexing feature characteristic of the arm extensions.

During operation, when the brake is activated following release of the clutch, the brake component of the clutch-brake combination is axially moved into contact-type engagement with a pair of brake lining elements disposed on opposite sides of the brake component. This axial displacement or sliding is accommodated by a corresponding axial deflection of the attached flex disk brake. The braking action is applied by the brake component due to its connection to the stationary crown via the flex disk brake. In particular, the motional rigidity of the flex disk brake in the rotary direction has the effect of applying a braking torque that opposes the crankshaft rotation and eventually stops the press working members. This rotational strength of the flex disk brake substantially prevents any rotary displacement of the brake component, thereby eliminating the free and undamped rotary clearances occurring in conventional machines.

The rigid coupling of the brake component to the flex disk also ensures that the brake component will be positively located in a non-interfering, spaced-apart relationship to adjacent brake lining elements during clutch engagement (i.e., brake release). In particular, when the clutch is engaged and the brake is released, the rigid connection of the flex disk brake to the brake component serves to accurately locate the brake component between the brake lining elements, thereby ensuring the maintenance of suitable axial clearances therebetween while the brake is idle.

Moreover, following completion of the braking activity, the axial elasticity of the flex disk brake is effective in returning the brake component to its idle position concurrent with the release of the brake actuating force.

In one form, the flex disk brake has a multi-layered construction formed of several thin laminated steel plates. This arrangement of stacked plates has a flexing behavior in the direction perpendicular to the plane of the steel plates. Accordingly, the flex disk brake is configured so that the flex direction coincides with the axis of displacement of the disk component. Additionally, the rotary motion of the brake component (and crankshaft) is parallel to the direction of greatest strength and rigidity in the flex disk brake, namely, the plane of the laminated steel plates, thereby offering the maximum possible braking action.

The invention, in one form thereof, is directed to a brake system for use in a machine environment. The brake system includes a brake member disposed within the machine and a flex brake unit coupled to the brake member. The flex brake unit comprises a brake disk coupled to the brake member, and at least one finger element extending from the brake disk. At least one of the finger elements is coupled to a stationary member of the machine.

In one form, a mechanism is provided to selectively connect the brake member to a rotary member of the machine.

In one form, at least one of the finger elements generally extends at least in part in a first generally circumferential direction of the brake disk. This first circumferential direction is generally opposite to a direction of rotation associated with operation of a rotary device of the machine.

In one form, the flex brake unit includes a flexing property having an axial directivity. In a preferred feature, the flexing property has a directivity substantially parallel to an operative displacement axis associated with the brake member.

In one form, the flexing property is preferably sufficient to enable movement of at least the portion of the brake disk coupled to the brake member. In another form, the flexing property is sufficient to enable displacement of the brake disk relative to a respective stationary portion of at least one corresponding finger element. In yet another form, the flex brake unit is formed and configured to be operationally axially flexible and substantially rotationally stationary.

The invention, in another form thereof, is directed to a brake system for use in a machine environment. The brake system includes a movable brake component disposed within the machine, and a connection means having a stationary portion and a movable portion. The movable portion is connected at least in part to the brake component.

In one form, the movable brake component further includes a brake disk annularly disposed about and selectively connectable with a rotary component of the machine.

In one form, the connection means further includes a flexible portion connecting the stationary portion and the movable portion.

In another form, the connection means further includes a disk means coupled to the brake component, and a first means for connecting the disk means to a stationary part of the machine. The first means preferably includes at least one connection element each providing a respective connection between the disk means at a periphery thereof and the stationary machine part. Each connection element includes a bent portion, which generally extends at least in part in a direction generally opposite to a direction of rotation associated with operation of a rotary component of the machine.

In yet another form, the connection means is adapted with a flexing property enabling movement of the movable portion thereof relative to the stationary portion thereof, according to a flexing action exhibited by the connection means.

In yet another form, the connection means is formed and configured to be operationally axially flexible and substantially rotationally stationary.

In one form, the machine environment includes a press machine having a crankshaft, the brake component includes a brake disk, and the press machine includes a mechanism to selectively connect the brake disk to the crankshaft.

The invention, in another form thereof, is directed to a brake system for use in a machine environment. The brake system includes a brake component disposed within the machine, and a spider mechanism connecting the brake component to a stationary part of the machine.

In one form, the spider mechanism further includes a disk coupled to the brake component, and a plurality of spider arms disposed about a periphery of the disk and coupled to the stationary part of the machine. Each spider arm preferably has a flexibility characteristic. The flexibility characteristic enables movement of the disk relative to the stationary part of the machine, in response to operative movement of the brake component.

In one form, each spider arm generally extends at least in part in a direction generally opposite to a direction of rotation associated with operation of a rotary device of the machine.

In another form, the spider mechanism is formed and configured to be operationally axially flexible and substantially rotationally stationary.

The invention, in another form thereof, is directed to a brake system for use in a machine environment. The brake system includes a brake component disposed within the machine, and an axially flexible connection device connecting the brake component to a stationary part of the machine.

In one form, the connection device further includes a body member coupled to the brake component, and a plurality of flexible spider arms disposed about a periphery of the body member and coupled to the stationary machine part. At least one of the spider arms generally extends at least in part in a direction generally opposite to a direction of rotation of a rotary device of the machine.

The flexibility of the spider arms is adapted to enable movement of the body member relative to a respective stationary portion of at least one corresponding spider arm.

In another form, the connection device further includes a spider mechanism including a plurality of flexible spider arms.

The invention, in yet another form thereof, is directed to a press. The press comprises a crown and a bed; a movable slide disposed for operative movement in opposed relation to the bed; a frame to guide operative movement of the slide; a flywheel; a driveshaft; a clutch assembly to selectively connect the flywheel and the driveshaft; and a brake assembly to selectively brake the driveshaft. The brake assembly includes a brake disk, a mechanism to selectively couple the brake disk to the driveshaft, and a flexible spider means connecting the brake disk and the crown.

In one form, the flexible spider means further includes a body member coupled to the brake disk, and a plurality of flexible spider arms extending from the body member and coupled to the crown. In one form, the spider arms are disposed about a periphery of the body member. The body member preferably has a generally disk shape.

The flexibility of the spider arms enables operative movement of the body member relative to a respective stationary portion of at least one corresponding spider arm.

In one form, at least one of the spider arms generally extends at least in part in a direction generally opposite to a direction of rotation of the driveshaft.

In another form, the spider means is formed and configured to be operationally axially flexible and substantially rotationally stationary.

The invention, in yet another form thereof, is directed to an article of manufacture for use as a brake device in a brake unit of a machine. The article includes a generally disk-shaped body member, and a plurality of arcuate finger elements each extending from the body member. Each finger element has a flex region normally defining a generally planar structure comprising a plurality of plate members disposed in a layering arrangement. The layering arrangement defines a flexing axis directed generally orthogonally to a planar dimension thereof.

One advantage of the present invention is that the flex brake unit eliminates free and undamped clearances in the rotational direction.

Another advantage of the invention is that the flex brake unit features both an axial flexibility to accommodate deflection of the brake disk during brake activation, and a rotational immovability that establishes a stationary braking force.

Another advantage of the invention is that the flex brake unit offers substantially no impact loading in the rotary direction during braking, since the unit is rotationally stationary.

A further advantage of the invention is that the flex brake disk in one form thereof includes a multi-layered steel construction that enables the flex brake to readily deflect in the axial direction during brake activation, while providing significant torquing opposition or rigidity along its planar dimension, which coincides with the direction of rotation of the brake-clutch combination.

A further advantage of the invention is that the flex brake disk features an elastic flexibility that provides a spring-type action which restores the deflected flex brake disk to its disengaged position following activation of the clutch and simultaneous deactivation of the brake.

A further advantage of the invention is that the problems associated with conventional brake splining mechanism, namely, the formation of clearances due to the vibration-related pounding out of the splines, is not present in the flex brake unit due to the significant torquing opposition exhibited by the flex brake disk that makes it rotationally stationary.

A further advantage of the invention is that the flex brake unit provides a braking configuration that makes it immune to the effects of vibration traveling through the machine and the related clearance-type problems.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
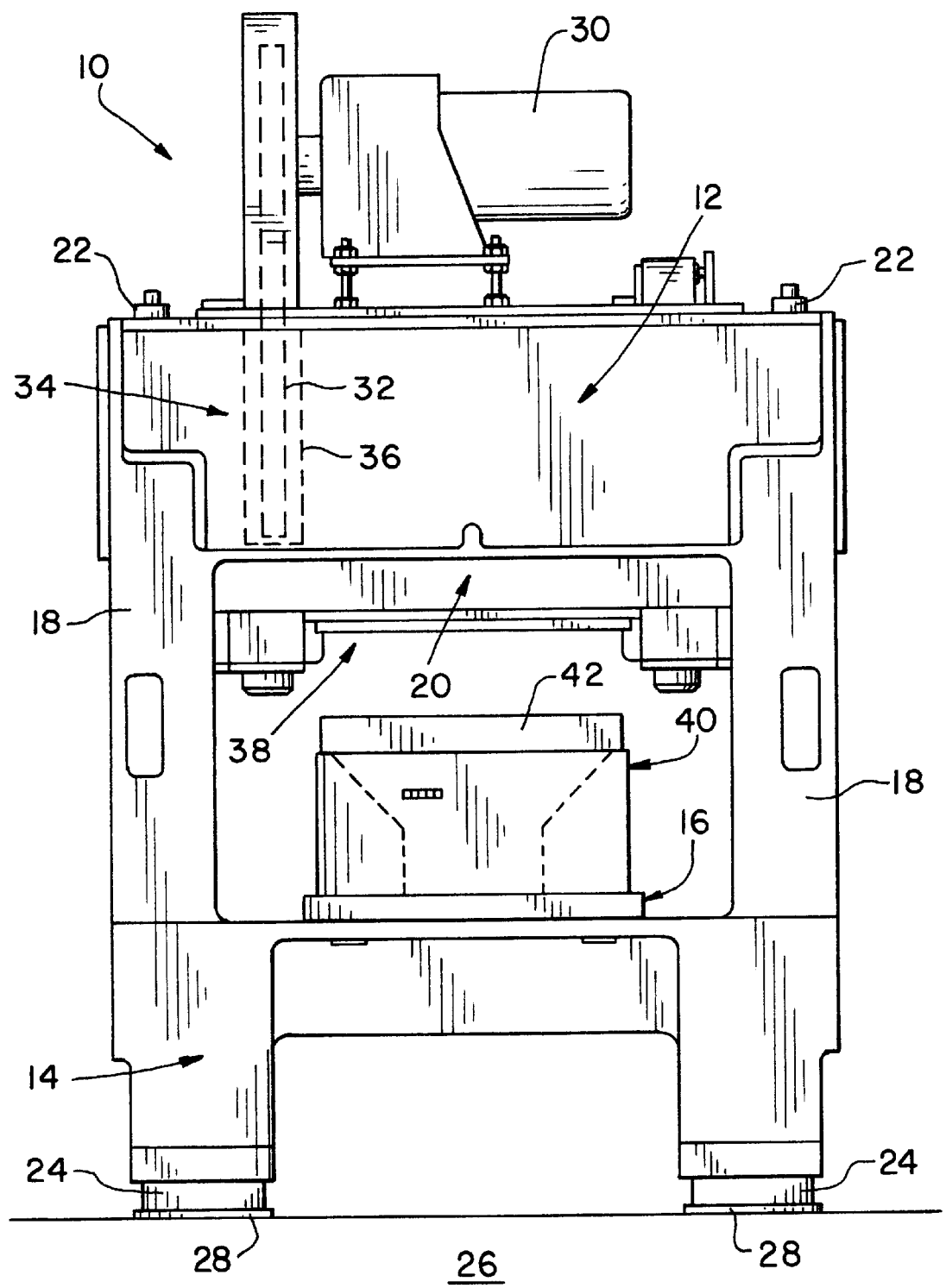
FIG. 1 is a front elevational view of a press machine in one illustrative form thereof incorporating the present invention.

The present invention may be incorporated into machines of the mechanical press type discussed previously. Referring to FIG. 1, there is shown one such mechanical press 10 of conventional form including a crown portion 12, a bed portion 14 having a bolster assembly 16 connected thereto, and uprights 18 connecting crown portion 12 with bed portion 14. Uprights 18 are connected to or integral with the underside of crown 12 and the upper side of bed 14. A slide 20 is positioned between uprights 18 for controlled reciprocating movement between crown 12 and bed 14.

Press machine 10 further includes an upper die shoe (referenced generally at 38) attached in a conventional manner to the lower end of slide 20. The upper die shoe 38 preferably includes a die element (not shown) attached thereto. A lower die shoe 40 having a die element 42 coupled thereto is attached in a conventional manner to the upper end of bolster 16.

The upper and lower dies, as so arranged in their opposing spaced-apart relationship, cooperate in a known manner during press operation to process a workpiece disposed therebetween, e.g., mounted on the lower die element 42. The upper and lower dies together constitute a die set or assembly. A plurality of guide posts (not shown) may be disposed between the upper die shoe 38 and lower die shoe 40 in a known manner.

Tie rods (not shown), which extend through crown 12, uprights 18 and bed portion 14, are attached at each end with tie rod nuts 22. Leg members 24 are formed as an extension of bed 14 and are generally mounted on shop floor 26 by means of shock absorbing pads 28. A drive motor 30, which is part of the press drive mechanism, is attached by means of a belt 32 to an auxiliary flywheel (referenced generally at 34) attached to crown 12. Auxiliary flywheel 34 is connected by means of a belt (not shown) to the main flywheel of the clutch/brake combination (depicted generally at 36).

Although press 10 is shown in a press-down configuration, it could alternately be constructed in a press-up configuration by arranging the press in an upside-down fashion. In this form, slide 20 would be connected to the lower unit instead of the upper unit, i.e., crown 12. If slide 20 is connected to the lower unit in such alternate press-up configuration, the lower unit would constitute the crown portion.

The form of the press machine shown in FIG. 1 is provided for illustrative purposes only, and therefore should not be considered in limitation of the present invention, as it should be apparent to those skilled in the art that the principles of the present invention may be practiced with, and incorporated into, various other machine configurations, including machine environments other than press applications.

Figure 2:
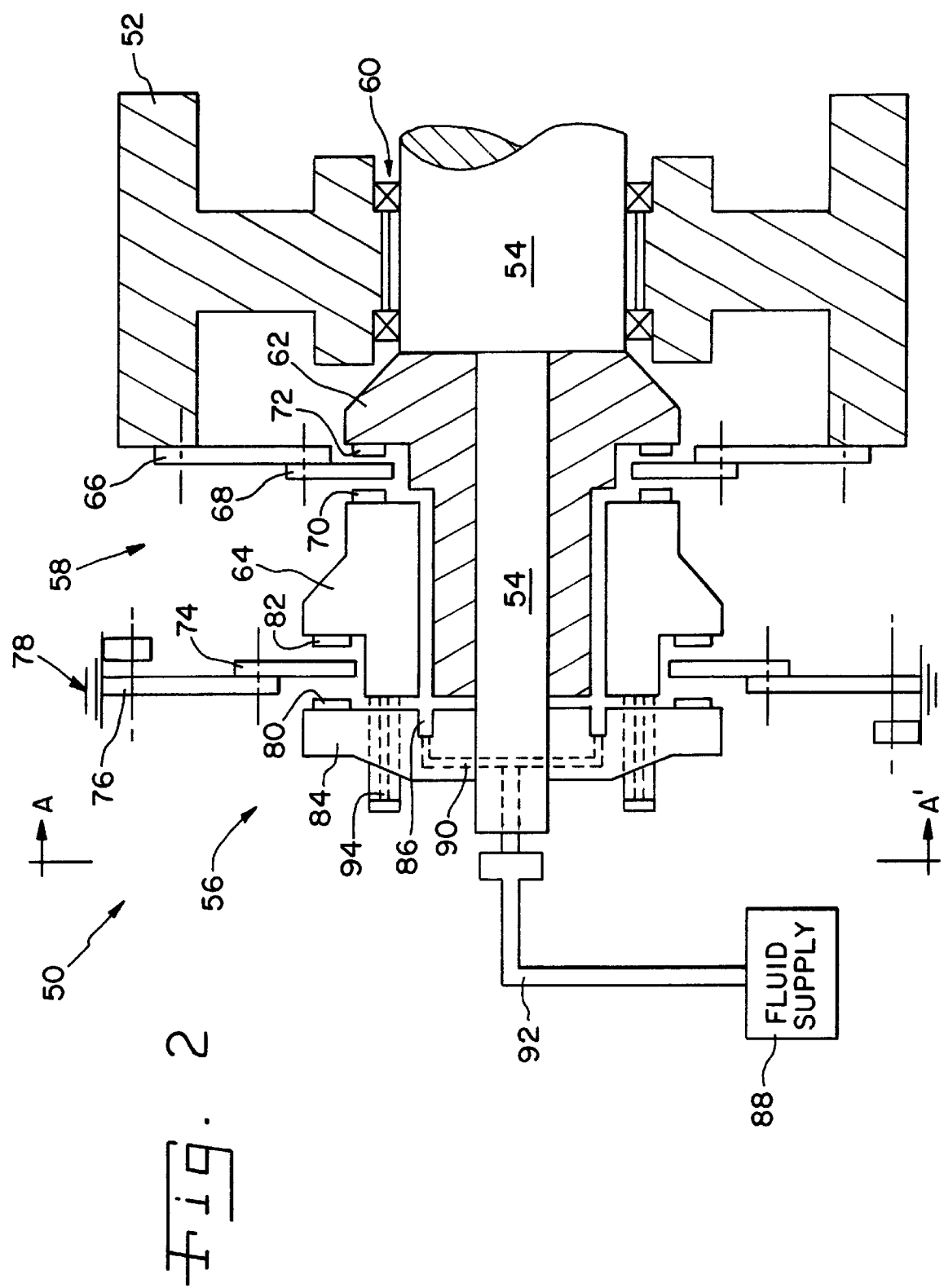
FIG. 2 is an axial cross-sectional, side elevational schematic view of a clutch-brake combination including a flex disk brake system, according to one embodiment of the present invention.

Turning now to embodiments of the present invention, reference is first made to FIG. 2 which illustrates an axial cross-sectional, side schematic view of a clutch-brake combination 50 for use in selectively connecting flywheel 52 to crankshaft 54 and selectively stopping the rotary motion of crankshaft 54. In conventional manner, a clutch action is used to couple flywheel 52 to crankshaft 54, while a braking action is used to stop crankshaft 54. For this purpose, the illustrative clutch-brake combination 50 includes a brake assembly (referenced generally at 56) and a clutch assembly (referenced generally at 58).

In brief, as discussed further, the present invention is directed to the use of a flex brake disk 76 attached at an inner portion thereof to brake disk 74 and attached at an outer portion thereof to crown member 78. These components form part of brake assembly 56. In a preferred form, flex brake disk 76 is axially flexible and rotationally stationary.

In one aspect of the invention, the illustrated brake assembly 56 is otherwise provided in any suitable configuration of conventional form, but is modified or otherwise adapted to incorporate flex brake disk 76 and to configure it for cooperative action with brake disk 74.

Accordingly, the features and components of clutch-brake combination 50 other than flex brake disk 76 may be provided in any suitable configuration. It should be apparent, then, that clutch-brake combination 50 is merely illustrative and should not be considered in limitation of the present invention. For example, other suitable brake mechanisms can be used that allow for integration with flex brake disk 76 of the present invention.

Referring again to FIG. 2, flywheel 52 is mounted upon crankshaft 54 using a bearing 60, according to a conventional form. In a preferred conventional arrangement, the illustrated clutch assembly 58 includes a clutch sleeve 62 mounted to crankshaft 54 and a clutch plate 64 annularly disposed thereabout. Clutch assembly 58 further includes a clutch disk 68 and a clutch flex disk 66 attached at an outer end to flywheel 52 and attached at an inner end to clutch disk 68, as shown. A pair of opposing, spaced-apart clutch lining elements 70 and 72 are suitably disposed in a conventional manner at axial surfaces of clutch plate 64 and clutch sleeve 62, respectively. Clutch disk 68 is interposed between clutch lining elements 70 and 72.

During activation of clutch assembly 58, clutch disk 68 is clamped between clutch lining elements 70, 72. For example, as discussed further, clutch plate 64 is sufficiently axially displaced (i.e., in the rightward direction of FIG. 2) until both clutch lining elements 70 and 72 are in suitable frictional-type, surface-to-surface contacting engagement with clutch disk 68. This clamping relationship is accommodated by a flex action in clutch flex disk 66. When clutch assembly 58 is disengaged, clutch disk 68 will be located in a sufficient spaced-apart relationship to both clutch lining elements 70, 72 (as shown).

These clutch lining elements 70, 72 are provided for the known purpose of facilitating a connection between flywheel 52 and crankshaft 54 by clamping clutch disk 68 between clutch plate 64 and clutch sleeve 62 in a sufficient torque-transferring relationship. In this manner, the rotary energy of flywheel 52 is transferred to clutch sleeve 62 and thereby to crankshaft 54. The clamping action is sufficient to enable clutch sleeve 62 to rotate with flywheel 52 with minimal or no drag slippage therebetween.

As indicated previously, the illustrated brake assembly 56 includes a brake disk 74 and a flex brake disk assembly 76, according to the present invention. This disk arrangement constitutes a stationary (non-flexed) configuration during a press running condition, i.e., engagement of the clutch.

Brake assembly 56 further includes a pair of opposing, spaced-apart brake lining elements 80 and 82 that are suitably disposed in a conventional manner at axial surfaces of piston housing 84 and clutch plate 64, respectively. Brake disk 74 is interposed between brake lining elements 80 and 82. During activation of brake assembly 56, brake disk 74 is clamped between brake lining elements 80, 82. This clamping arrangement is sufficient to enable brake assembly 56 to exert a counter-torguing influence on crankshaft 54 via clutch plate 64, which is mounted to and rotates with crankshaft 54. The braking action provided by brake assembly 56 is sufficient to stop the rotary motion of crankshaft 54.

The illustrated piston housing 84 is provided in a conventional form disposed about crankshaft 54 in a conventional manner. Piston housing 84 serves as an actuator mechanism that selectively controls the operating modes of clutch-brake combination 50, namely, clutch engagement and brake engagement. In one illustrative form, piston housing 84 includes a piston element (not shown) housed in a hydraulic pressurizing chamber generally indicated at 86.

The piston element is arranged in suitable actuating relationship to clutch plate 64 to enable displacement of the piston element to effect a corresponding movement of clutch plate 64. Chamber 86 is arranged for fluid communication with hydraulic fluid supply 88 using any suitable fluid conveyance means, such as fluid channels 90 formed in crankshaft 54 and fluid coupling apparatus 92. Any suitable hydraulic actuator apparatus may be used other than a piston-based implementation.

During operation, when clutch engagement is desired, fluid chamber 86 is suitably pressurized to induce a displacement of the associated piston element. This piston displacement is sufficient to axially displace clutch plate 64 in a manner sufficient to cause clutch disk 68 to be clamped between clutch lining elements 70 and 72, as described previously.

The pressurization of fluid chamber 86 is likewise sufficient to overcome the biasing action of bias spring 94 connected to clutch plate 64. The bias spring 94 is provided in a conventional form and acts to positively locate clutch plate 64 in a braking arrangement characterized by engagement of brake disk 74 with brake lining elements 80 and 82, which occurs in the absence of hydraulic pressurization in chamber 86. In particular, the spring action of bias spring 94 is sufficient when it is unopposed to draw clutch plate 64 towards brake disk 74 and further move brake disk 74 into engagement with brake lining element 80 to create the desired brake-type clamping arrangement.

The illustrated actuator mechanism for displacing clutch plate 64, namely, piston housing 84 and bias spring 94, is provided for illustrative purposes only and should not be considered in limitation of the present invention. It should be understood that any other suitable actuator mechanism may be provided to facilitate the clutch action and brake action.

As discussed further, the brake-type clamping arrangement involving brake disk 74 and brake lining elements 80, 82 is accommodated by a flexing action exhibited by flex brake disk 76, which enables brake disk 74 to displace axially (i.e., slide in the leftward direction of FIG. 2) and into engagement with brake lining element 80. This axial movement of brake disk 74 is actuated by the return action of bias spring 94 following removal of the hydraulic pressurization in chamber 86, which facilitates release of the clutch.

More particularly, as discussed further, clutch plate 64 is sufficiently axially displaced under the spring action of bias spring 94 until both brake lining elements 80 and 82 are in suitable frictional-type, surface-to-surface contacting engagement with brake disk 74. According to one aspect of the present invention, this clamping relationship is accommodated by a flex action in flex brake disk 76. When brake assembly 56 is disengaged (i.e., when clutch assembly 58 is engaged by suitable pressurization of chamber 86), brake disk 74 will be located in a sufficient spaced-apart relationship to both brake lining elements 80, 82 (as shown).

As known, these brake lining elements 80, 82 are provided for the conventional purpose of facilitating a braking connection between crankshaft 54 and an anti-rotational element of brake assembly 56. In additional embodiments, elements 80 and 82 could also be mounted on brake 74 instead of on elements 84 and 64. In the first particular case, when brake disk 74 is clamped between clutch plate 64 and piston housing 84, brake assembly 56 exerts a counter-rotational influence upon the rotation of clutch plate 64 and hence crankshaft 54. The rotational resistance provided by brake assembly 56 is sufficient to halt rotation of crankshaft 54. The brake clamping force is sufficiently strong such that brake disk 74 experiences minimal or no drag slippage with brake lining elements 80 and 82.

To this point, the referenced components of clutch-brake combination 50 other than flex brake disk 76 form part of a conventional implementation. Such flex disk brake is an assembly of laminated disks. Accordingly, this arrangement should not be considered in limitation of the present invention, as it should be apparent that any suitable clutch-brake combination may be used. The clutch assembly 58, in particular, does not form part of the present invention. Moreover, any suitable brake assembly 56 may be used, to the extent that it can be adapted for use with the flex brake mechanism of the present invention.

Additionally, as discussed further, clutch-brake combination 50 provides a synchronous-type arrangement characterized by the use of an actuator mechanism (e.g., piston housing 84) configured to assist in the actuation of both brake assembly 56 and clutch assembly 58. In particular, the enabling/disabling conditions for brake assembly 56 and clutch assembly 58 are paired together in an interdependent manner.

More specifically, in conventional fashion, the actuation mechanism that activates clutch assembly 58 also causes brake assembly 56 to concurrently disengage. In similar manner, when clutch assembly 58 is disengaged to release flywheel 52 from its connection with crankshaft 54, brake assembly 56 becomes engaged to apply a braking action to crankshaft 54. It is then seen that a single actuating event selectively controls clutch activation and brake deactivation to engage the press working devices, or brake activation and clutch deactivation to terminate press operation.

However, this synchronous configuration is merely illustrative and should not be considered in limitation of the present invention. Any suitable brake assembly 56 and clutch assembly 58 may be used. For example, it may be possible to use a separate brake assembly 56 and clutch assembly 58 having independent actuating events. For this purpose, a master controller would be provided to supervise and appropriately coordinate the control of the braking and clutch mechanisms. It is of course preferable that the braking action immediately follows or occurs simultaneously with release of the clutch, while clutch engagement immediately follows or occurs simultaneously with release of the brake.

Figure 3:
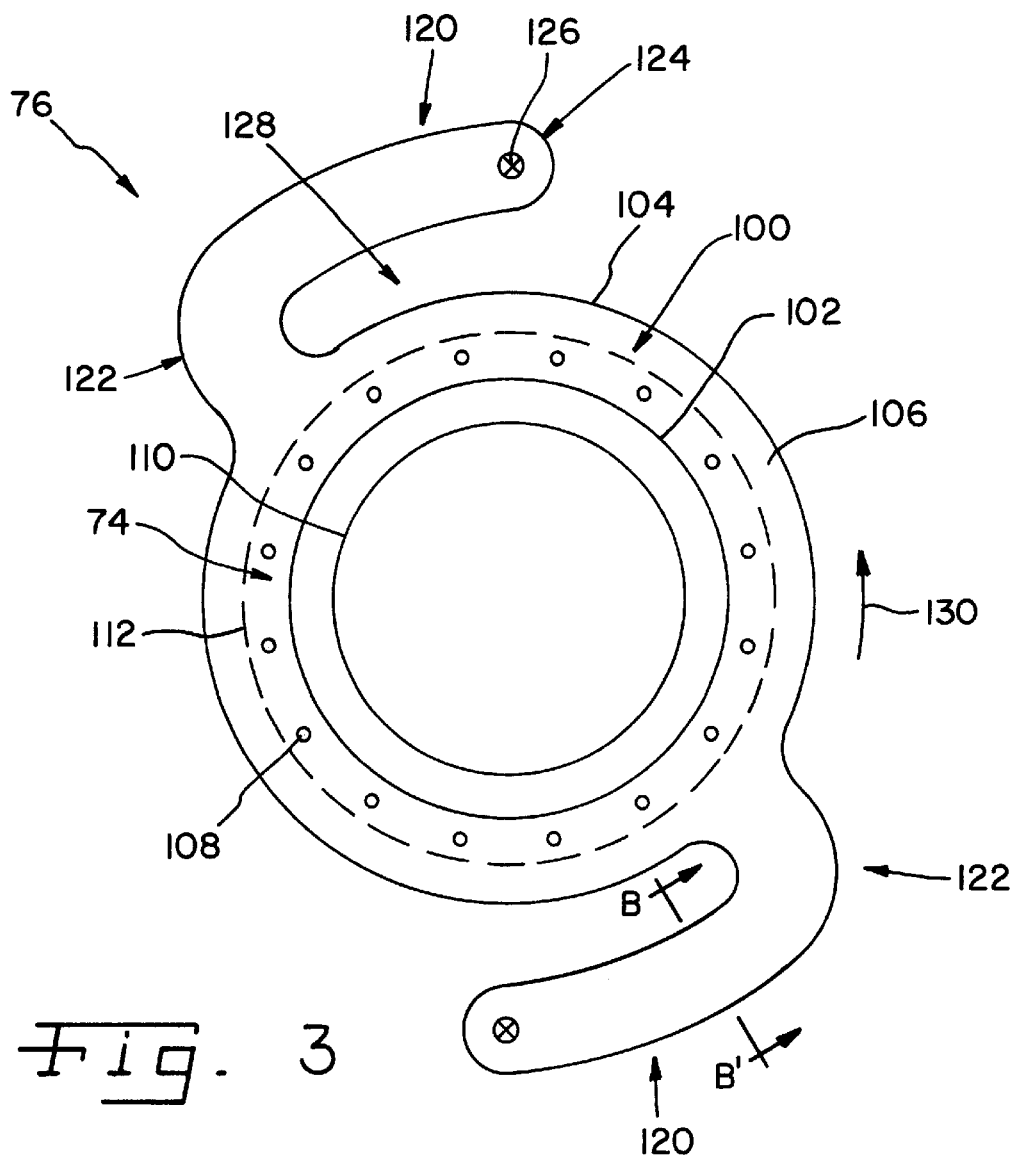
FIG. 3 is a planar, schematic view of the flex disk brake of FIG. 2 taken along the axial dimension A–A'.

Referring now to FIG. 3, there is shown a planar schematic view of flex brake disk 76 of FIG. 2 taken along its axial dimension, according to one embodiment of the present invention. Flex brake disk 76 is shown in its cooperative arrangement with brake disk 74.

The illustrated flex brake disk 76 includes a ring portion 100 having an inner radial circumferential side 102 and an outer radial circumferential side 104. Brake ring 100 further includes an axial side surface 106 (e.g., inward-facing) to which brake disk 74 is mounted using bolts 108. The illustrated brake disk 74 includes an inner radial circumferential side 110 and an outer radial circumferential side 112.

According to one feature of the present invention, flex brake disk 76 includes a plurality of flange-type projection elements 120 disposed circumferentially in spaced-apart relationship about ring portion 100. In a preferred form, each projection element 120 extends from the outer radial side 104 of ring portion 100. The projection elements 120 are preferably integrally formed with ring portion 100, although it should be apparent that projection elements 120 can be formed separately as discrete pieces attached by known means to ring portion 100.

In various alternate forms, projection elements 120 may be considered a flange, an attachment piece, an extension, a connection means, an arm member, a finger member, a spider element, and a spider arm. In one form, the flex brake disk 76 may be considered a spider connection mechanism having a body portion 100 and spider elements 120 radiating therefrom.

Each projection 120 includes a proximal end (referenced generally at 122) and a distal end (referenced generally at 124). The proximal end 122 of projection 120 extends from brake ring 100 at the outer radial side 104 thereof. The distal end 124 of projection 120 is secured or otherwise anchored to a stationary part (e.g., press crown) using any suitable mounting means (e.g., bolts 126).

In a preferred form, each projection 120 extends at least in part in a circumferential direction of brake ring 100 to form a bent or arcuate-shaped configuration. The bent profile preferably forms a slot 128 defined between an inner side of projection 120 and the outer radial side 104 of brake ring 100.

According to another aspect of the invention, this circumferential direction along which projection 120 extends is opposite to a direction of rotation of clutch plate 64 and crankshaft 54, shown illustratively at 130. Thus, for the indicated counterclockwise rotation, projection 120 will extend in the clockwise direction. Alternately, for clockwise rotation of crankshaft 54, projection 120 will be configured to extend in the counterclockwise direction. This orientation of projection 120 relative to the crankshaft rotation plays an important role during braking operation because it offers an optimal resistance to rotation as the rotating clutch plate 64 engages brake disk 74 and applies a counterclockwise torquing force both to brake disk 74 and flex brake disk 76 at ring 100 thereof. The invention is not limited to the orientation since many also work backwards.

As discussed further, projection 120 has a multi-layered steel plate construction that is arranged such that the torque applied by clutch plate 64 is applied along the direction of greatest dimensional strength in projection 120, namely, the planar dimension of the thin stacked plates. In this manner, with the assistance of the secured connection to the press crown, projection 120 is able to remain substantially rotationally stationary during such torque application, thereby optimally developing a braking action that stops clutch plate 64 and crankshaft 54.

The illustrated projection 120 may be provided in various bent-type configurations suitable for developing a structural arrangement that offers optimal or maximal torque resistance. Various fabrication, geometrical, material, and dimensional parameters may be controlled to provide an optimum configuration for projection 120.

For example, it should be understood that flex brake disk 76 provides a better braking action when projection 120 conforms more generally to a circumferential curvature, as compared to a bent profile having a more radial flaring feature. For example, it may be considered that slot 128 having a narrower radial dimension is preferred over a wider slot geometry.

Although only two projections 120 are shown in FIG. 3, it should be apparent that any number of such projections 120 may be used. Additionally, although projection 120 extends from a peripheral edge of brake ring 100 in a preferred form, it may also be possible to provide projection 120 so as to extend from an axial side surface of brake ring 100. Moreover, projection 120 may be secured at its distal end 124 to any stationary structure other than the press crown.

According to another aspect of the invention, flex brake disk 76 is formed and configured with an axial flexing feature that enables brake ring 100 to displace axially relative to the fixed stationary connection of projection 120 to the press crown. This flexibility is needed to accommodate the axial movement of brake disk 74 under the actuating influence of clutch plate 64, as discussed previously in regard to the braking action.

Figure 4:
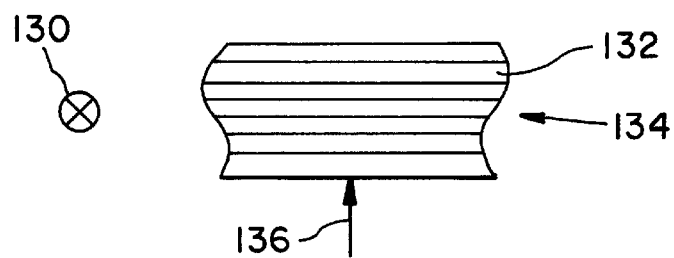
FIG. 4 is a cross-sectional, partial schematic view of a portion of the flex disk brake in FIG. 3 taken along line B–B'.

For this purpose, projection 120 is suitably formed to exhibit at least in part a flexing action in the axial dimension. Referring to FIG. 4, projection 120 is formed with a multi-layered stainless steel construction comprising a plurality of thin steel plates 132 provided in a planar stacking arrangement 134, as illustrated by the cross-sectional schematic view taken along lines B–B' of FIG. 3.

As shown, the direction of rotation 130 for clutch plate 64 and crankshaft 54 is in the plane of each plate 132. There is substantial motional rigidity along this planar dimension of plate 132. Additionally, the stacking arrangement 134 is capable of deflecting along the dimension indicated by direction 136, which is substantially perpendicular to the planar dimension of each plate 132. This direction 136 is substantially parallel with the direction along which clutch plate 64 (and brake disk 74) displace during a braking operation. Accordingly, projection 120 can readily flex in response to axial displacement of brake disk 74 as communicated by tandem movement of brake ring 100.

It may be considered that this axially-directed flexing action occurs along the length of projection 120 generally extending from its anchored connection to the press crown (i.e., distal end 124) to the area generally about the peripheral edge 104 of ring 100. In a preferred form, brake ring 100 does not flex in any material respect, but maintains a constant axial geometry even when displaced.

Figure 5A:
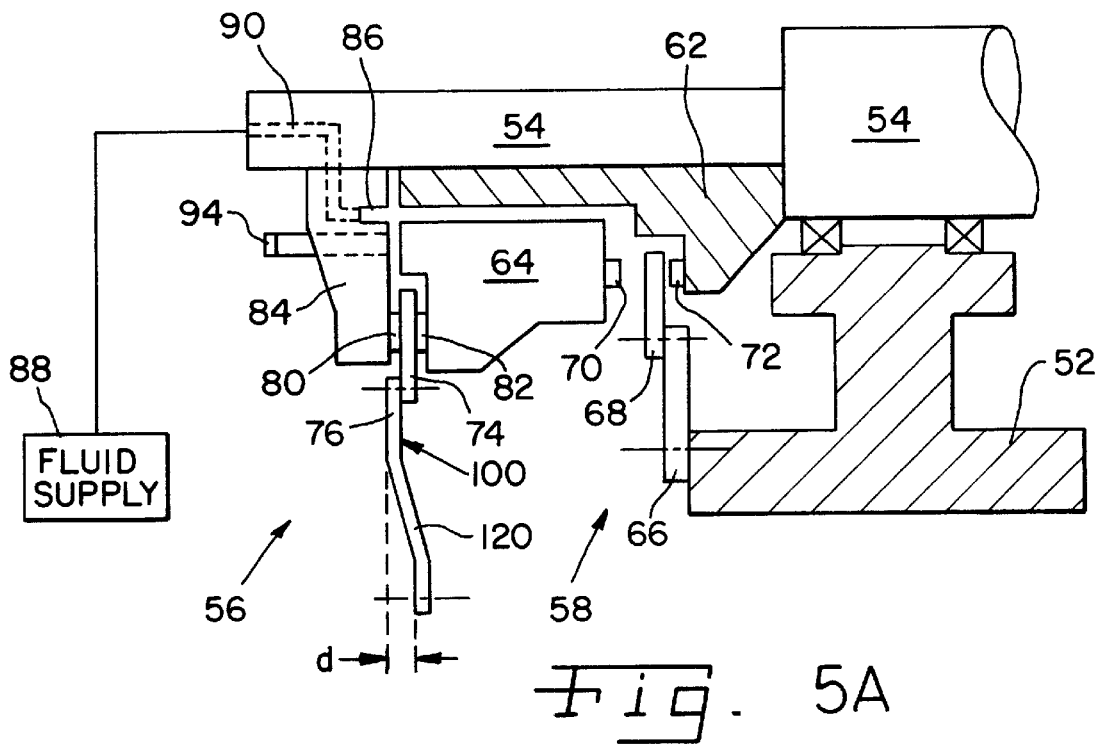
FIGS. 5A and 5B depict partial, cross-sectional, schematic side views of the clutch-brake combination of FIG. 2 representing the cooperative arrangement of parts during brake engagement and clutch engagement, respectively.
Figure 5B:
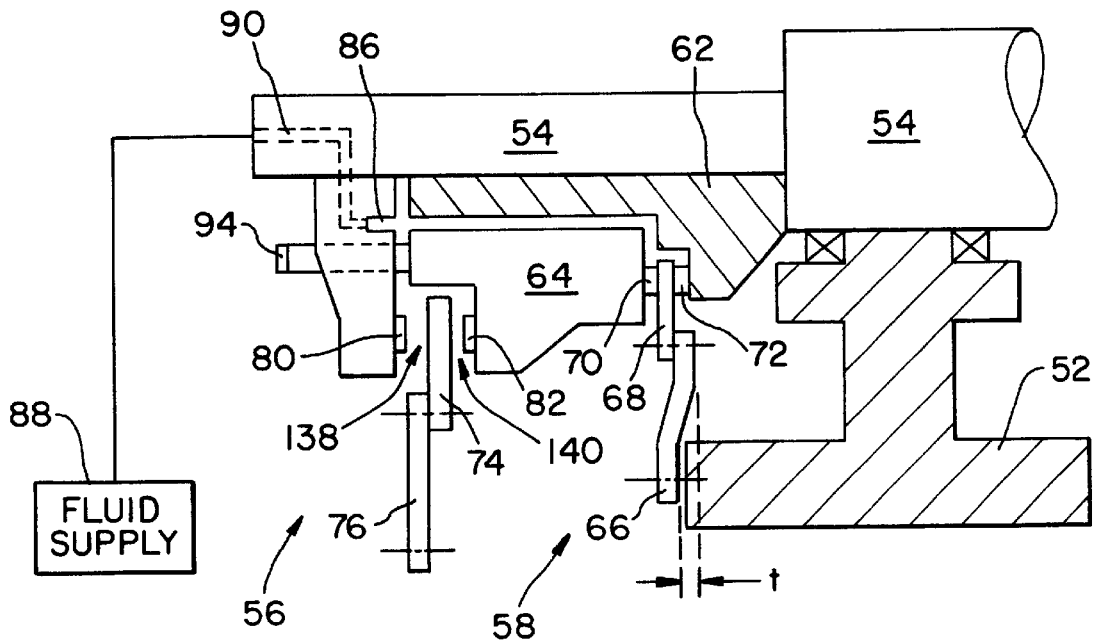

Referring now to FIG. 5, there is shown in partial sectional view the configuration states for flex brake disk 76 during brake activation (FIG. 5A) and clutch engagement (FIG. 5B). FIG. 5 also depicts the cooperative arrangement involving brake assembly 56 and clutch assembly 58.

Referring first to FIG. 5A, the illustrated configuration depicts a braking condition made present by activating brake assembly 56 in concert with the release of clutch assembly 58. In particular, upon removal of the pressurization in piston housing chamber 86, the return spring action of bias spring 94 acts upon clutch plate 64 and slides it axially, i.e., displaces it along the longitudinal dimension of crankshaft 54. For the FIG. 5A configuration, this displacement occurs in the leftward direction.

Clutch plate 64 first is drawn axially into engagement with brake disk 74 at brake lining element 82. At this point, flex brake disk 76 is still in a non-flexed state. Thereafter, the spring action continues to axially draw clutch plate 64 and brake disk 74 in unison towards piston housing 84 until brake disk 74 engages with brake lining element 80, as shown. At this point, a sufficient brake-effective clamping arrangement has been established between brake disk 74 and brake lining elements 80, 82.

Because of its mounting relationship to brake disk 74, the part of flex brake disk 76 directly fastened to brake disk 74 (i.e., brake ring 100) must move in tandem with brake disk 74. As shown, the tandem movement of brake disk 74 and flex brake disk 76 (along with clutch plate 64) is accommodated in flex brake disk 76 by a flexing action in projection element 120 (FIG. 3). This flexing action is illustratively represented by deflection distance "d". The flexing action permits axial movement of flex brake ring portion 100 while flex brake disk 76 remains anchored to the press crown by the stationary crown attachment in place at the distal end 124 (FIG. 3) of projection element 120.

In this configuration, the rotational energy (i.e., torquing influence) communicated by crankshaft 54 to brake assembly 56 (i.e., brake disk 74) via clutch plate 64 is opposed and otherwise resisted by a rotary braking action developed in flex brake disk 76 and then applied to clutch plate 64 via brake disk 74. The braking action is applied in a counter-rotational manner to the direction of crankshaft rotation. The braking action is sufficient to stop clutch plate 64 and crankshaft 54.

Referring to FIG. 5B, the illustrated configuration depicts a clutch engagement condition made present by activating clutch assembly 58 in concert with the release of brake assembly 56. In particular, piston housing chamber 86 is sufficiently pressurized to induce an axial displacement of the piston element that exerts an actuating influence upon clutch plate 64 that urges it to move along the axial dimension. For the FIG. 5B configuration, this displacement occurs in the rightward direction.

As shown, clutch plate 64 is sufficiently displaced by the hydraulic actuating mechanism until clutch disk 68 is engaged in a clamping arrangement with clutch lining elements 70 and 72. The tandem movement of clutch disk 68 in tandem with clutch plate 64 following engagement therebetween is accommodated in clutch flex disk 66 by a flexing action therein. This flexing action is illustratively represented by deflection distance "t". In this configuration, the rotational energy of flywheel 52 can be transferred to crankshaft 54 by the torque-transfer connection established between flywheel 52 and clutch sleeve 62 using clutch assembly 58, i.e., clutch flex disk 66 and clutch disk 68. The configuration and operation of clutch assembly 58 follows conventional approaches.

As indicated previously, the clutch assembly 58 is engaged by actuating axial movement of clutch plate 64 using a hydraulic pressurization apparatus. In FIG. 5B, as clutch plate 64 moves axially in the rightward direction as part of the clutch activation process, the prior brake clamping arrangement depicted in FIG. 5A is released. In particular, the flexing characteristic exhibited in FIG. 5A has a property of elasticity that enables flex brake disk 76 to return to a fully non-flexed condition such as shown in FIG. 5B.

The elastic property of flex brake disk 76 restores brake assembly 56 to the configuration shown in FIG. 5B in which brake disk 74 is disposed in spaced-apart relationship to brake lining elements 80 and 82, as indicated by respective clearances referenced generally at 138 and 140. The elastic quality of flex brake disk 76 has a reproducible character that enables clearances 138 and 140 to be adequately maintained throughout repeated and prolonged use of brake assembly 58.

Figure 6:
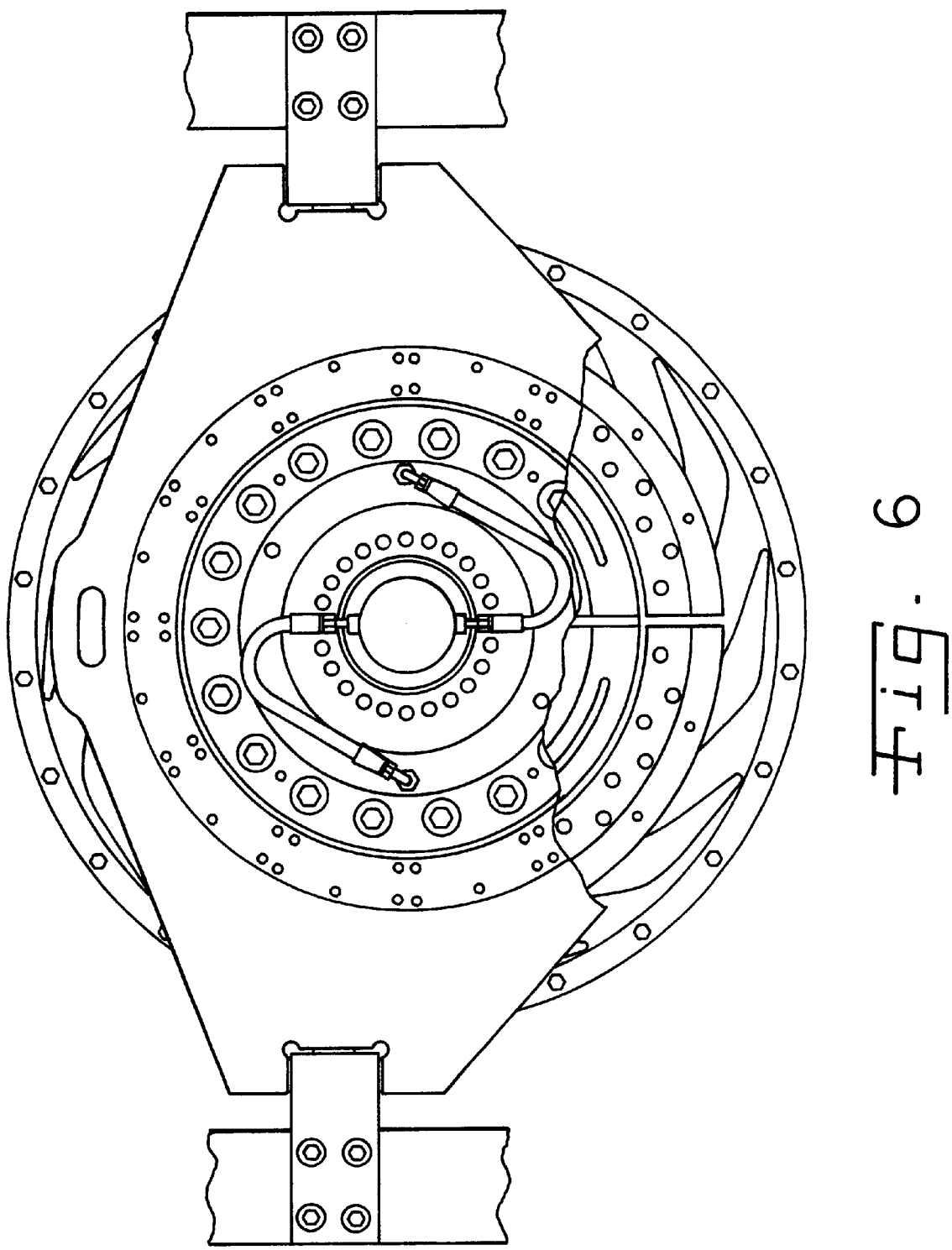
FIG. 6 is a planar, schematic sectional view of the mounting configuration for the brake assembly of FIG. 2.
Figure 7:
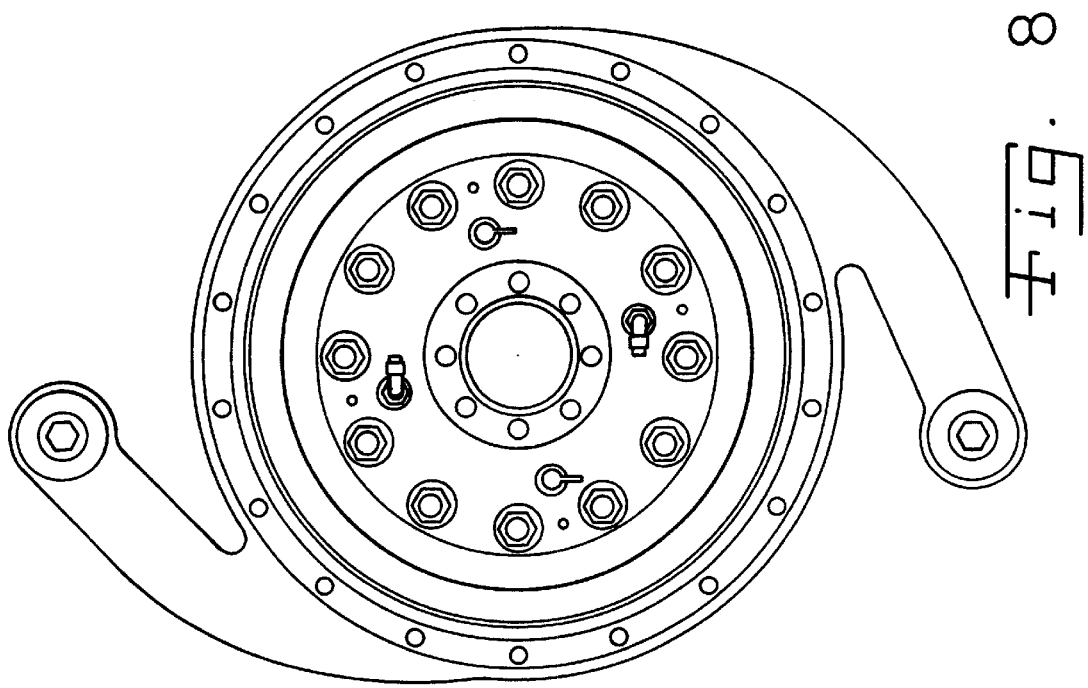
FIG. 7 is a planar, schematic sectional view of an alternate embodiment of the mounting configuration for the brake assembly of FIG. 2.
Figure 8:
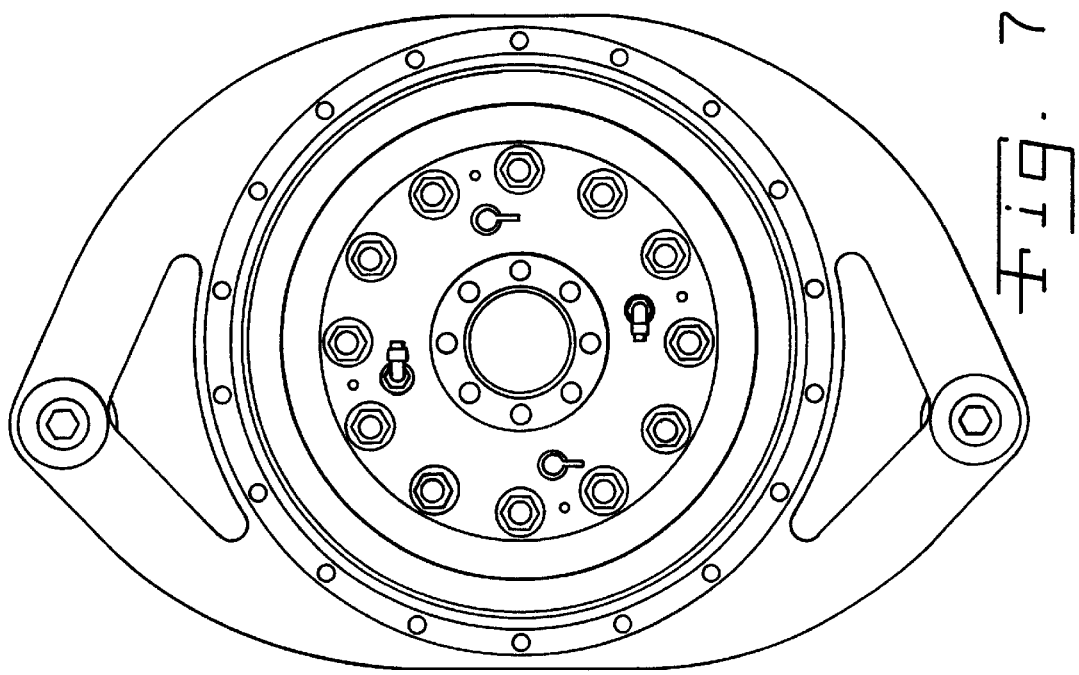
FIG. 8 is a planar, schematic sectional view of an alternate embodiment of the mounting configuration for the brake assembly of FIG. 2.

FIG. 6 is a planar sectional view illustrating the manner of mounting brake disk 74 with keys. FIG. 7 is a planar, sectional view illustrating the manner of mounting the flex disk with bidirectional flex elements. FIG. 8 is a planar, sectional view illustrating the manner of mounting the flex disk with unidirectional flex elements.

What has been shown and described herein is a flex brake disk preferably formed of multiple layers of stainless steel. This construction will permit the flex brake disk to move very easily along the axis of the crankshaft. The projection members will be able to flex or deflect very easily because the height dimension will consist of several thin plates. The multiple layers of steel will provide significant rigidity in the rotational direction, and thereby prevent free and undamped clearances in the rotational direction.

The extension of the flex brake disk are bolted to the crown, thereby preventing movement at the ends of the flex brake disk. When the clutch is engaged, the brake will release and the flex brake disk will be free, thereby allowing the rotary members in the press to rotate. The flex brake disk will spring back to the center of the clearance between the brake linings. During brake idling, there will be no contact between the flex brake disk and any rotating members, thereby avoiding any heat buildup.

The extensions of the flex brake disk will tend to center the brake disk and thus eliminate the brake disk from moving back and forth in the free axial clearance during clutch engagement. This will eliminate heat buildup and deterioration of brake parts.

Among the various advantages of the present invention, the flex brake disk removes free and undamped clearances in the rotational direction. In conventional clutches, the brake disk is mounted on keys, studs, or splines. These devices permit the brake disk to move axially when the springs pinch the members with the lining material. In order to move the brake disk, there has to be some clearance on a mating member to permit the brake disk to slide axially. The brake disk needs to be supported in a stationary position to enable it to supply the stopping torque.

However, normal stamping operations typically send vibrations throughout the press structure that will cause the heavy brake disk to bounce in the mounting keys or other means of supporting the brake disk. In the present invention, the rigid mounting of the flex brake disk extensions arms to the crown will eliminate any free and undamped clearances, thereby avoiding the costly maintenance of brake disk keys, splines, studs or other support methods that is undertaken in conventional machines.

In conventional clutches and brakes, the brake disk simply floats and may touch either brake lining, leading to costly repairs. However, the flex brake disk of the present invention will eliminate the brake disk from touching either brake lining. Since the arms on the flex brake disk are firmly fastened to the crown, the laminated multi-layered steel construction will spring back to their original flat shape, thereby eliminating any touching between the brake linings and either side of the brake disk.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A brake system for use in a machine, comprising:
   a brake member disposed within said machine; and
   a flex brake unit coupled to said brake member, said flex brake unit having a multi-layer, plate construction, said flex brake unit comprising a brake disk coupled to said brake member, said flex brake unit further comprising a single pair of finger elements extending from said brake disk, at least one said finger element coupled to a stationary member of said machine, each said finger element generally extending at least in part in a first generally circumferential direction of said brake disk.

2. The brake system as recited in claim 1, further comprises:
   a mechanism to selectively connect said brake member to a rotary member of said machine.

3. The brake system as recited in claim 1, wherein the first circumferential direction of said brake disk being generally opposite to a direction of rotation associated with operation of a rotary device of said machine.

4. The brake system as recited in claim 1, wherein said flex brake unit having a flexing property.

5. The brake system as recited in claim 4, wherein the flexing property of said flex brake unit having an axial directivity.

6. The brake system as recited in claim 4,
   wherein the flexing property of said flex brake unit having a directivity substantially parallel to an operative displacement axis associated with said brake member.

7. The brake system as recited in claim 4, wherein the flexing property of said flex brake unit being sufficient to enable movement of at least the portion of said brake disk coupled to said brake member.

8. The brake system as recited in claim 4, wherein the flexing property of said flex brake unit being sufficient to enable displacement of said brake disk relative to a respective stationary portion of at least one corresponding finger element.

9. The brake system as recited in claim 1, wherein said flex brake unit being formed and configured to be operationally axially flexible and substantially rotationally stationary.

10. A brake system for use in a machine environment, comprising:
   a movable brake component disposed within said machine; and
   a connection means having a stationary portion and a movable portion, said movable portion being connected at least in part to said brake component, said connection means having a multi-layer plate construction, said movable portion comprising a single pair of connection elements extending from said stationary portion, at least one said connection element coupled to a stationary member of said machine, each said connection element generally extending at least in part in a first generally circumferential direction of said stationary portion.

11. The brake system as recited in claim 10, wherein said movable brake component further comprises:
   a brake disk annularly disposed about and selectively connectable with a rotary component of said machine.

12. The brake system as recited in claim 10, wherein at least one said connection element comprises a flexible portion connecting the stationary portion and the movable portion.

13. The brake system as recited in claim 10, wherein said connection means further comprises a disk means coupled to said brake component.

14. The brake system as recited in claim 13 wherein at least one said connection element provides a respective connection between said disk means at a periphery thereof and said stationary machine part.

15. The brake system as recited in claim 14, wherein each said connection element has a bent portion.

16. The brake system as recited in claim 15, wherein the respective bent portion of each connection element generally extends at least in part in a direction generally opposite to a direction of rotation associated with operation of a rotary component of said machine.

17. The brake system as recited in claim 10, wherein said connection means being adapted with a flexing property enabling movement of the movable portion thereof relative to the stationary portion thereof, according to a flexing action exhibited by said connection means.

18. The brake system as recited in claim wherein said machine is a press machine having a crankshaft, said brake component includes a brake disk, and said press machine includes a mechanism to selectively connect said brake disk to said crankshaft.

19. The brake system as recited in claim 10, wherein said connection means being formed and configured to be operationally axially flexible and substantially rotationally stationary.

20. The brake system of claim 10, wherein said multi-layer plate construction includes a plurality of thin, laminated steel plates.

21. The brake system of claim 10, wherein said multi-layer plate construction is structured and arranged so as to define a flexing axis of said connection means as being directed generally orthogonally to a plate planar dimension of said multi-layer plate construction.

22. The brake system of claim 21, wherein said multi-layer plate construction is most rigid in a direction generally parallel to the plate planar dimension.

23. A brake system for use in a machine, comprising:
   a brake component disposed within said machine; and
   a spider mechanism connecting said brake component to a stationary part of said machine, said spider mechanism having a multi-layer, construction plate, said spider mechanism further comprises:
   a disk coupled to said brake component; and
   a single pair of spider arms disposed about a periphery of said disk and coupled to the stationary part of said machine, each said spider arm generally extending at least in part in a first generally circumferential direction of said disk.

24. The brake system as recited in claim 23, wherein said spider mechanism further comprises:
   a disk coupled to said brake component.

25. The brake system as recited in claim 23, wherein each spider arm having a flexibility characteristic.

26. The brake system as recited in claim 25, wherein the flexibility characteristic associated with each said spider arm enables movement of said disk relative to the stationary part of said machine, in response to operative movement of said brake component.

27. The brake system as recited in claim 23 wherein each spider arm generally extending at least in part in a direction generally opposite to a direction of rotation associated with operation of a rotary device of said machine.

28. The brake system as recited in claim 23, wherein said spider mechanism having a flexibility characteristic.

29. The brake system as recited in claim 28, wherein the flexibility characteristic of said spider mechanism enabling one portion thereof connected to said brake component to move relative to another portion thereof connected to the stationary part of said machine.

30. The brake system as recited in claim 23, wherein said spider mechanism being formed and configured to be operationally axially flexible and substantially rotationally stationary.

31. A brake system for use in a machine environment, comprising:
   a brake component disposed within said machine; and
   an axially flexible connection device connecting said brake component to a stationary part of said machine, said axially flexible connection device having a multi-layer plate construction, said connection device comprising:
   a body member coupled to said brake component; and
   a single pair of flexible spider arms disposed about a periphery of said body member and coupled to the stationary machine part, each said spider arm generally extending at least in part in a first generally circumferential direction of said body member.

32. The brake system as recited in claim 31, wherein at least one said spider arm generally extends at least in part in a direction generally opposite to a direction of rotation of a rotary device of said machine.

33. The brake system as recited in claim 31, wherein the flexibility associated with said plurality of spider arms being is adapted to enable movement of said body member relative to a respective stationary portion of at least one corresponding spider arm.

34. The brake system as recited in claim 31, wherein said connection device being formed and configured to be operationally axially flexible and substantially rotationally stationary.

35. A brake device for use in a brake unit of a machine, comprising:

a generally disk-shaped body member; and a single pair of arcuate finger elements each extending from said body member, each said finger element generally extending at least in part in a first generally circumferential direction of said body member, each said finger element having a flex region normally defining a generally planar structure comprising a plurality of plate members disposed in a layering arrangement, wherein the layering arrangement defining a flexing axis directed generally orthogonally to a planar dimension thereof.

* * * * *